United States Patent
Brown, Jr. et al.

(10) Patent No.: US 7,592,714 B2
(45) Date of Patent: Sep. 22, 2009

(54) IGNITION BYPASS SYSTEM

(75) Inventors: Charles Barroy Brown, Jr., Holt, MI (US); Michael Joseph Trebilcott, Jr., Okemos, MI (US)

(73) Assignee: Safe Stop International, LLC, Okemos, MI (US)

( * ) Notice: Subject to any disclaimer, the term of this patent is extended or adjusted under 35 U.S.C. 154(b) by 5 days.

(21) Appl. No.: 11/382,431

(22) Filed: May 9, 2006

(65) Prior Publication Data

US 2007/0262642 A1    Nov. 15, 2007

(51) Int. Cl.
*B60R 22/00* (2006.01)
*F02P 9/00* (2006.01)
*H02G 3/00* (2006.01)

(52) U.S. Cl. ..................... 307/10.6; 180/287
(58) Field of Classification Search ............... 307/10.6, 307/9.1, 10.2–10.3; 180/271, 279, 283, 287
See application file for complete search history.

(56) References Cited

U.S. PATENT DOCUMENTS

| | | | |
|---|---|---|---|
| 4,403,675 A | 9/1983 | Cardwell | |
| 4,754,838 A | 7/1988 | Cody | |
| 4,898,010 A | 2/1990 | Futami et al. | |
| 5,042,439 A | 8/1991 | Tholl et al. | |
| 5,115,145 A | 5/1992 | Westberg et al. | |
| 5,180,924 A | 1/1993 | Rudisel | |
| 5,621,252 A | 4/1997 | Buckman | |
| 5,670,831 A | 9/1997 | Georgiades | |
| 5,673,017 A | 9/1997 | Dery et al. | |
| 5,689,142 A | 11/1997 | Liu | |
| 5,751,073 A | 5/1998 | Ross | |
| 5,874,785 A | 2/1999 | Liu | |
| 2003/0137195 A1 | 7/2003 | Suzuki | |
| 2004/0227615 A1 | 11/2004 | John et al. | |

FOREIGN PATENT DOCUMENTS

| | | |
|---|---|---|
| JP | 01287385 | 11/1989 |
| JP | 10053109 | 2/1998 |
| JP | 2000071940 | 3/2000 |
| JP | 2002201841 | 7/2002 |

*Primary Examiner*—Rexford N Barnie
*Assistant Examiner*—Carlos Amaya
(74) *Attorney, Agent, or Firm*—The Weintraub Group, PLC

(57) ABSTRACT

A system and method for bypassing the ignition switch and controlling operation of an engine and an accessory drive of a vehicle, the system comprising an ignition switch, a user-activated secondary switch, a control logic circuit, and a third switch. The ignition switch controls operation of the engine that enables the engine to operate when the ignition switch is in an ON state. The user-activated secondary switch makes a connection in a parallel electrical power supply circuit to the engine and vehicle accessory drive, when the secondary switch is in the CLOSED state. The control logic circuit is responsive to the ignition switch, the secondary switch, and a user-activated vehicle control device. The third switch is associated with a user-activated vehicle control device wherein the third switch causes the logic circuit to interrupt the parallel electrical power supply circuit, when the user-activated vehicle control device is activated.

20 Claims, 3 Drawing Sheets

IGNITION BYPASS SYSTEM

FIELD OF THE INVENTION

This application is directed to an automotive motor vehicle controlling system that allows a vehicle user to leave a vehicle unattended with a running engine and with the ignition key removed.

BACKGROUND OF THE INVENTION

Systems exist that allow a user to remotely start a vehicle. Such remote starting devices are frequently used by persons in hot or cold climates to cool or preheat the passenger compartment. One of the problems associated with these remote starting systems was that the vehicle is vulnerable to operation by unauthorized users. Many of the existing patents in this area of endeavor are directed to preventing unauthorized use of the remotely started vehicle.

The prior art does not appear to address situations where a vehicle is used for maintenance or some other form of work, such as work performed by workmen outside the vehicle, which may require periods where the vehicle must be left running but unoccupied. For example, some utility maintenance trucks have a bucket lift for lifting a workman to perform maintenance, the operation of which may require the engine to be running to provide the electrical or hydraulic power to the bucket lift. In addition, the workmen may need to exit the maintenance truck to inspect a work site. At times like this, it is inconvenient to repeatedly turn off and turn on the vehicle using the key switch and waste fuel by restarting the engine at each stop. In these situations, if the vehicle is left operating, the ignition key must be in the ignition key switch and switched to the ON position. When the vehicle is in this state, it is vulnerable to unauthorized or inadvertent use.

Examples of attempts to provide such a system include U.S. Pat. No. 4,403,675 to Cardwell, U.S. Pat. No. 4,754,838 to Cody, U.S. Pat. No. 5,115,145 to Westberg et al., U.S. Pat. No. 5,180,924 to Rudisel, and U.S. Pat. No. 5,670,831 to Georgiades. These systems use a single relay to prevent unauthorized use when a vehicle engine is operating and the ignition key is removed.

Other examples of attempts to provide such a system include a keyless engine controlling unit, U.S. Patent Application Publication US 2003/0137195 to Suzuki. In the disclosed system, the locked state of the door lock switch for operating the door lock, in particular, the driver's seat side door lock, state is detected. The disclosed system detects the number of times the driver's side door lock switch is turned on and off.

SUMMARY

A system for controlling the operation of an engine and an accessory drive of a vehicle, the system comprising an ignition switch, a user-activated secondary switch, a logic circuit, and a third switch. The ignition switch controls operation of the engine that enables the engine to operate when the ignition switch is in an ON state. The user-activated secondary switch makes a connection in a parallel electrical power supply circuit to the engine and vehicle accessory drive, when the secondary switch is in the CLOSED state. The control logic circuit is responsive to the ignition switch, the secondary switch, and a user-activated vehicle control device. The third switch is associated with a user-activated vehicle control device wherein the third switch causes the control logic circuit to interrupt the parallel electrical power supply circuit, when the third switch is closed.

In an alternative embodiment, a system for controlling the operation of an engine and an accessory drive of a vehicle is disclosed. The system comprises an ignition switch, a user-activated secondary switch, a logic circuit, and a third switch. The ignition switch controls operation of the engine that enables the engine to operate when the ignition switch is in an ON state. The user-activated secondary switch makes a connection in a parallel electrical power supply circuit to the engine and vehicle accessory drive, when the secondary switch is left in the CLOSED state. The logic circuit is responsive to the ignition switch, the secondary switch, and a user-activated vehicle control device. The third switch is associated with a user-activated vehicle control device wherein the third switch causes the logic circuit comprising a first device and a second device, wherein the first device causes the opening of the contacts of the second device, which interrupts the parallel electrical power supply path, when the user-activated vehicle control device is activated.

Also, disclosed is a method for controlling the operation of a vehicle comprising a passenger compartment, a vehicle accessory device, an engine, a logic circuit, user-activated vehicle control device, a starter motor and an electrical power supply. By switching an ignition switch to an ON position when a vehicle engine is running, electrical power is supplied to the engine and vehicle accessory drive. A secondary switch is activated to a CLOSED state to establish via a logic circuit a parallel electrical power supply path to the engine and vehicle accessory drive. The logic circuit comprises a first device and a second device, wherein the first device provides an electrical signal to the second device causing the second device to close contact terminals for providing a parallel electrical power supply path to the engine and vehicle accessory drive. The key is removed from the ignition key switch by switching the ignition key switch to an OFF position. The passenger compartment is left unoccupied with the engine running and electrical power supplied to the engine and vehicle accessory drive.

One embodiment of the logic circuit comprises a first device and a second device, each of which has contact terminals for providing electrical power to the engine and vehicle accessory drive. The key is removed from the ignition key switch after switching the ignition key switch to an OFF position. A user can leave the passenger compartment unoccupied with the engine running and electrical power supplied to the engine and vehicle accessory drive.

BRIEF DESCRIPTION OF THE DRAWINGS

The above embodiments of the invention will be explained with reference to the figures, which are shown in the appended drawings.

DETAILED DESCRIPTION

Figure 1:
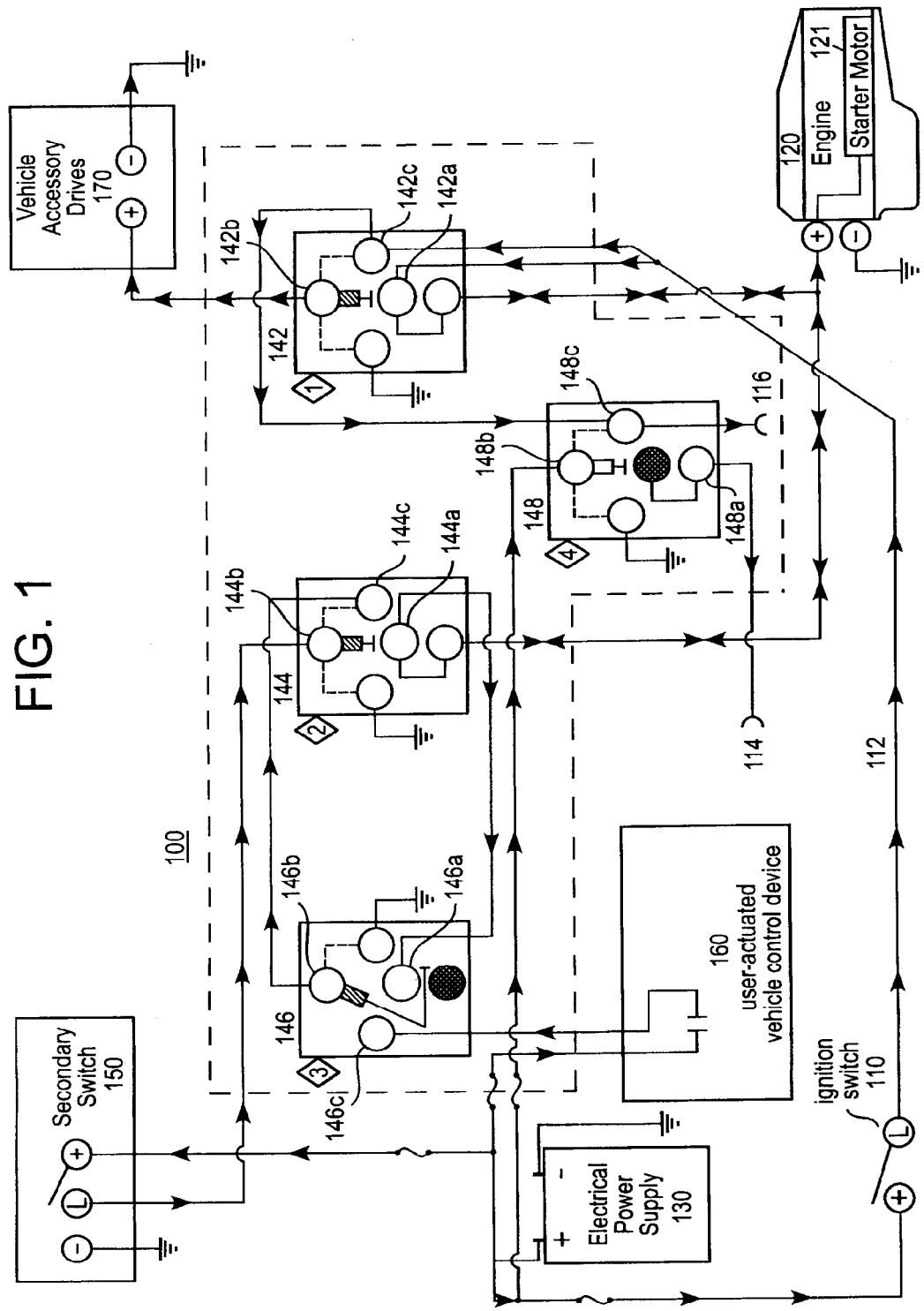
FIG. 1 is a schematic drawing of an exemplary embodiment of the present invention.

FIG. 1 illustrates an exemplary embodiment of a system for controlling the operation of an engine and accessories of a vehicle. The vehicle can be any vehicle having an ignition switch for starting the vehicle. As shown in FIG. 1, the exemplary engine control logic circuit system 100 comprises an ignition switch 110, such as an ignition key switch found in a typical vehicle, a secondary switch 150 such as a maintained, normally-open push button switch with an indicator light, and a control logic circuit comprising logic circuits 142, 144, 146 and 148. The logic circuits 142, 144, 146 and 148 are relays having plural contacts and actuating coils, such as automotive relays manufactured by NTE Electric Inc., NTE model R51-5D40-12, or Baja Tough, single-pole, double-throw 30 ampere relays, model DF005 20-3529-8.

The exemplary vehicle has an engine 120, an electrical power supply 130, and vehicle accessory drives 170. The engine 120 can be a typical gasoline-powered, diesel-powered, hybrid gasoline/diesel-electric engine or other engine for providing driving power and for powering accessories connected to the vehicle. The electrical power supply 130 is a battery, such as a 12-volt or a 24-volt battery, or an electric generator. Vehicle accessory drives 170 are drives to operate vehicle accessories such as, but not limited to, bucket lifts for lifting a worker to reach wiring, such as telephone or power-transmission wiring, digging or drilling equipment, material handling equipment, communications equipment, such as an antenna, and the like.

The ignition switch 110 controls the operation of the engine 120 and the vehicle accessories. The ignition switch 110 provides power over at least two power supply wires, such as 112 and 114. The power supply wires 112 and 114 are capable of handling up to 30 amperes of electrical current. Some vehicles have additional power supply wires connected with the ignition switch 110, such as wire 116. The ignition switch 110 is a key-operated, four-position switch, having an OFF position, an accessories position (ACC), an ON (or RUN) position and a START position. Although, other types of ignition switches having similar operating positions may be used. The START position is typically a momentary position, which causes engagement of an engine starter motor 121. The engine starter motor 121 turns the engine 120 to start the engine 120, after which the ignition switch is returned to the ON (or RUN) position, and the engine starter motor 121 no longer turns the engine 120.

Generally, when the ignition switch 110 is in the ON state, the engine 120 is operating, i.e. running. The secondary switch 150, when closed, provides a parallel electrical power supply to the vehicle engine 120 and vehicle accessory drives 170 when the ignition switch 110 is in the OFF state and/or the key is removed.

In this embodiment, the ignition switch 110 is a four-position key switch as described above. A user starts the vehicle engine 120 in the typical manner of turning the key switch 110 in the START position. After the engine 120 has started, the key switch is turned to the ON position. The secondary switch 150 is actuated while the engine 120 is operating, and the ignition switch 110 is in the ON state. When the secondary switch 150 is actuated and the ignition switch 110 is placed in the OFF position, the engine 120 will continue to operate as will the vehicle accessory drives 170 because the logic circuits 142, 144, 146 and 148 are responsive to the ignition switch 110 and the secondary switch 150. With the secondary switch 150 actuated, the user of the vehicle may remove the key from the ignition switch 110 and leave the passenger compartment of the vehicle to, for example, operate one of the vehicle accessory devices, such as the bucket lift, to perform work outside of the vehicle. In this embodiment, the secondary switch 150 is left in the CLOSED position for the duration of the use of the vehicle by a user.

In the disclosed embodiment, logic circuit 146 will detect the actuation of a user-activated vehicle control device 160, such as a brake pedal. Alternatively, other logic circuits 144 or 148 can be used to detect actuation of the user-activated vehicle control device 160. When logic circuit 146 detects actuation of the user actuated vehicle control device 160 and the key is removed from the ignition switch 110, the logic circuit 146 will stop the operation of the engine 120 and any vehicle accessory devices 170.

An example of the operation of the logic circuits 142, 144, 146 and 148 will now be described in more detail. Each logic circuit 142, 144, 146 and 148 is a relay, either normally-closed or normally-open, comprising an electromagnetic coil responsive to electrical power on electromagnetic coil terminals, and contact terminals. Although, description of the exemplary embodiments is made with reference to relays, such reference is not meant to be limiting.

When the user of the vehicle enters the vehicle, the key is typically inserted in the ignition switch 110. Other devices, such as a remote control device that is detected by the vehicle which allows actuation of an ignition switch, may be used in place of the key switch. In the typical vehicle ignition switch, after inserting the key in the ignition switch 110, the user actuates the ignition switch 110 to the START position to start the engine 120. After the engine 120 has started, the ignition switch 110 is placed in the ON (or RUN) position to maintain the running of the engine 120, provide the vehicle accessory drives 170 with electrical power, and allow the vehicle to be operated.

With the ignition switch 110 in the ON position, electrical power from the electrical power supply 130 is provided to the coil terminal 142c and the contact terminal 142a on a first logic circuit 142. First logic circuit 142 is a normally open (NO) relay, in which the contact terminals 142a and 142b are open when no electrical power is present at the coil terminal 142c. Electrical power provided to the coil terminal 142c of the first logic circuit 142 causes electrical contacts 142a and 142b to make contact with one another. Vehicle accessory drives 170 are provided electrical power through the closed contact terminals 142a and 142b of first logic circuit 142.

Electrical power is provided from the electrical power supply 130 via ignition switch 110, ignition wire 112 to the coil terminal 142c of the first logic circuit 142 to the coil terminal 148c of the fourth logic circuit 148.

Fourth logic device 148 is also a normally open (NO) relay. When the coil terminal 148c of the fourth logic circuit 148 is supplied with electrical power, contact terminals 148a and 148b make contact and supply electrical power from the electrical power supply 130 to a second ignition wire 114. Second ignition wire 114 also provides accessory power to the vehicle. For instance, in the case of an automobile, second ignition wire 114 may provide power to the vehicle radio, power windows, power door locks, communication equipment and the like. In some vehicles, a third ignition wire 116 may provide power to other accessories, such as power seats, moon roof, or the like. When ignition wire 116 is provided, it can be connected to terminal 148c or any other contact or coil terminal that will supply it with power. First logic circuit 142, via the ignition switch 110 and a wire connected to contact terminal 142a, provides power to contact terminal 144a of second logic circuit 144. Contact terminal 144a is connected to contact terminal 146a of the third logic circuit 146.

Third logic circuit 146 can be a normally closed (NC) relay having a coil terminal 146c and contact terminals 146a and 146b. Electrical power supplied to contact terminal 144a of the second logic circuit 144 is therefore supplied to contact terminals 146a and 146b of third logic circuit 146. Electrical power is supplied to coil terminal 144c of the second logic terminal 144 via the closed contact terminals 146a and 146b.

By supplying electrical power to coil terminal 144*c*, contact terminals 144*a* and 144*b* make contact with one another. Contact terminal 144*b* of the second logic circuit 144 is connected to the load side of the secondary switch 150, i.e., the side of the secondary switch 150 not connected to the electrical power supply 130. The above described circuit arrangement is maintained whenever the key of the ignition switch 110 is in the ON position.

The capability to remove the key from the ignition switch 110 and the vehicle remaining operable is provided by actuating the secondary switch 150. Secondary switch 150 can be a toggle switch, a push button switch, a key switch, or a similar switch capable for use in the system. The user actuates the secondary switch 150 and provides a parallel electrical power supply path to the vehicle electrical circuits from the electrical power supply 130 via the logic circuits 142, 144, 146 and 148. The parallel electrical power supply path provides electrical power to the engine 120, including, but not limited to, the fuel injection system, engine control computer, distributor system, and other systems requiring electrical power. As shown in FIG. 1, the positive side of the secondary switch 150 is connected to the electrical power supply 130. With secondary switch 150 closed, electrical power is supplied from electrical power supply 130 to the closed contact terminals 144*b* and 144*a* of the second logic device 144. The parallel electrical power supply path is established.

When the user places the ignition switch 110 in the OFF position to remove the key, the electrical power provided via the ignition switch 110 is removed from the circuit. However, because electrical power is supplied through the parallel power supply path formed by the secondary switch 150 and contact terminals 144*b* and 144*a* of the logic circuit 144, electrical power is maintained at the vehicle engine 120, the vehicle accessory drives 170 and ignition wires 112 and 114 (and, if provided, 116). This is accomplished because the electrical power provided through closed contact terminals 144*a* and 144*b* is distributed in the same path and reverse path that electrical power was supplied through ignition switch 110.

The parallel electrical power distribution scheme through the closed secondary switch 150 will now be described in more detail. The parallel electric power supply path is made by closing secondary switch 150. The closed secondary switch 150 creates a parallel electrical power supply path to the logic circuits 142, 144, 146, and 148. The logic circuits 142, 144, 146, and 148 operate to make the connections necessary to complete the parallel electrical power supply path. In the logic circuits 142, 144, 146, and 148, electrical power is provided from contact terminal 144*a* to contact terminal 146*a* of NC third logic circuit 146 to the coil terminal 144*c* of second logic circuit 144, which maintains the closed connection between contact terminals 144*a* and 144*b*. The closed connection between contact terminals 144*a* and 144*b* allows electrical power to be supplied to the logic circuits 142, 146 and 148.

Electrical power is supplied from contact terminal 144*a* to contact terminal 142*a* and coil terminal 142*c* of first logic circuit 142 and coil terminal 148*c* of fourth logic circuit 148. With the coil terminal 142*c* energized, contact terminals 142*a* and 142*b* make contact providing electrical power to the vehicle accessory drives 170. Whenever coil terminal 142*c* is energized, coil terminal 148*c* of the fourth logic circuit 148 is also energized because the two coil terminals are connected in series. Contact terminals 148*a* and 148*b* make contact when coil terminal 148*c* is energized, thereby providing electrical power from electrical power supply 130 to ignition wire 114 (and, if available, 116).

The user may now exit the passenger compartment or driving area of the vehicle and operate any of the vehicle accessory drives 170 that depend on the engine 120 to be operating, such as a bucket lift or antenna, without concern that an unauthorized user will operate the vehicle, or an authorized user will inadvertently operate the vehicle.

The system prevents unauthorized or inadvertent use of the vehicle by deactivating the holding circuit created by NC third logic circuit 146 whenever a user-activated vehicle control device 160, such as a clutch pedal, a brake pedal, an acceleration pedal, a gear shift device, a parking brake release, or the like, is actuated. The actuation of a user-activated vehicle control device 160 closes a third normally open (NO) control switch. For instance, in the case of a brake pedal, the NO switch closes to provide electrical power to brake indicator lights and other control devices.

When the user-activated vehicle control device 160 is actuated, the third switch causes electrical power to be supplied to coil terminal 146*c* of the NC third logic circuit 146. Energizing coil terminal 146*c* causes the relay to open the connection between normally-closed contact terminals 146*a* and 146*b*, thereby removing power from coil terminal 144*c* of second logic circuit 144. Since the contact terminals of second logic circuit 144 are normally open, when electrical power is removed from coil terminal 144*c*, the connection between contact terminals 144*a* and 144*b* is broken, and electrical power is removed from the ignition. Actuation of the user-activated vehicle control device 160 interrupts the parallel electrical power supply path to the engine and the vehicle accessory drives.

In this state, electrical power is not provided to the engine or vehicle accessory drives. The engine will stop operating (i.e., running) and vehicle accessory drives that depend on the operating engine 120 will be inoperable, i.e., the vehicle will be immobile, the engine will not operate and the vehicle accessory drives will be de-energized because the parallel power supply path provided by secondary switch 150 is open and the ignition switch 110 is in the OFF state.

As a safety precaution in some types of vehicles a user must actuate a user-activated vehicle control device 160, such as a brake pedal or clutch pedal, prior to starting the engine 120. This safety precaution is part of the manufacturer's vehicle ignition system and is unaltered by the present system. After actuating the user-activated vehicle control device 160, if required, the ignition switch 110 is switched to the START position. If the ignition switch 110 is a key-operated switch, the key would have to be inserted and turned to the START position.

The secondary switch 150 does not need to be switched to the OFF (OPEN) state for the vehicle engine 120 to be re-started. By re-starting the vehicle engine 120 using the key-operated ignition switch 110 with the secondary switch 150 in the CLOSED (ON) state, the key can be removed from the key-operated ignition switch 110 immediately, and the engine 120 will continue to run and electrical power will be provided to the vehicle accessory drives 170. The secondary switch 150 remains closed after the user-activated vehicle control device 160 is actuated. Unless the secondary switch 150 is opened by the user, the parallel power supply is automatically established when the vehicle is re-started.

If the secondary switch 150 is switched to the OFF state prior to the re-starting of the vehicle engine 120, the vehicle engine 120 will stop running when the ignition switch 110 is switched to the OFF position.

Alternatively, a user can enter or occupy the vehicle passenger compartment, and insert the key into the ignition switch 110 without actuating a user-activated control device 160 to operate the vehicle without opening the closed secondary switch 150. After actuating the key to the ON position, the vehicle is in a mobile state and can be operated in a normal manner. The user can operate (i.e., drive) the vehicle to another location. The secondary switch 150 is left in the CLOSED position. The user can keep the secondary switch 150 in the CLOSED position for an extended period of time, even while stopping, removing the key from the ignition key switch 110 and returning to operate the vehicle normally. The next time the user safely stops the vehicle, the user can place the vehicle in a parked position, turn the ignition key switch 110 to the OFF position, and leave the vehicle compartment without having to re-activate the secondary switch 150 to the CLOSED position.

The engine control logic circuit system 100 can also be provided with a device to prevent, if the vehicle engine is already operating, the attempted re-starting of the vehicle engine 120. Such a situation can arise when a vehicle user returns to the vehicle after having actuated the secondary switch 150, removed the key from the key-operated ignition switch 110, and exited the passenger compartment. Most vehicle users are in the habit of inserting a key in a key-operated ignition switch 110 and turning the key-operated ignition switch 110 to the START position. Typically, when the key is turned to the START position, the starter motor 121 is energized and attempts to start the motor 120. Since the motor 120 is already running, the gears of the engine 120 and the starter motor 121 collide causing the gears to grind. The grinding is harmful to both the starter motor 121 and the engine 120.

Figure 2:
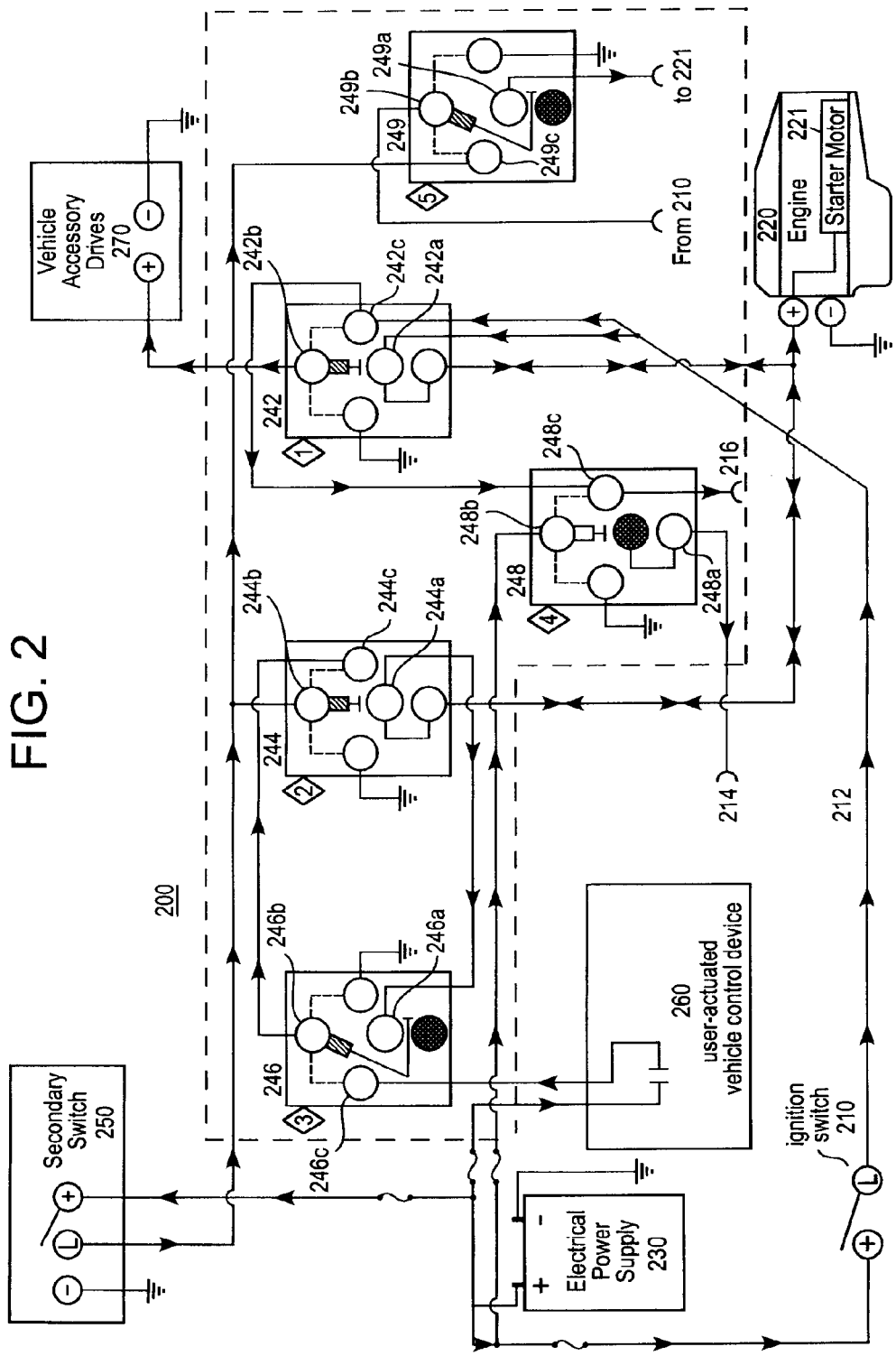
FIG. 2 is a schematic drawing of another exemplary embodiment of the present invention.

The system shown in FIG. 2 illustrates an embodiment of an engine control system 200 that prevents grinding the gears of the starter motor 221 with the gears of the engine 220. This embodiment utilizes substantially the same configuration as that described with respect to FIG. 1. Therefore, only a description of the new components will be made. In this embodiment, the engine control logic circuit system 200 utilizes a fifth logic circuit 249, which is a NC relay similar to the type used for third logic circuit 244 (which is the same as logic circuit 144 in FIG. 1). This fifth logic circuit 249 is called an anti-grind relay.

Referring now to FIG. 2, the coil terminal 249c of the fifth logic circuit 249 is supplied with power from the electrical power supply 230 when the secondary switch 250 is in the CLOSED position. This causes NC fifth logic circuit 249 to open contact terminals 249b and 249a. Typically, electrical power from the electrical power supply 230 is provided to the starter motor 221 via the ignition switch 210. However, when fifth logic circuit 249 is used, the wire from the ignition switch 210 that typically supplies power to the starter motor 221 or a device which causes the engagement of status is connected to contact terminal 249a and the wire connected to starter motor 221 is connected to contact terminal 249b, the ignition switch 210 is typically in the START position when power is supplied to the starter motor 221. Therefore, when the secondary switch 250 is actuated to the CLOSED (ON) position, electrical power is not provided to the starter motor 221.

To re-start the vehicle engine 220, the secondary switch 250 must be in the OPEN (OFF) position. A user-activated engine control device 260, having a third switched associated with it, may have to be activated, and the ignition switch 210 must be switched to the START position. If the ignition switch 210) is a key-operated switch, the key would have to be inserted prior to switching the ignition switch 210 to the START position.

Figure 3:
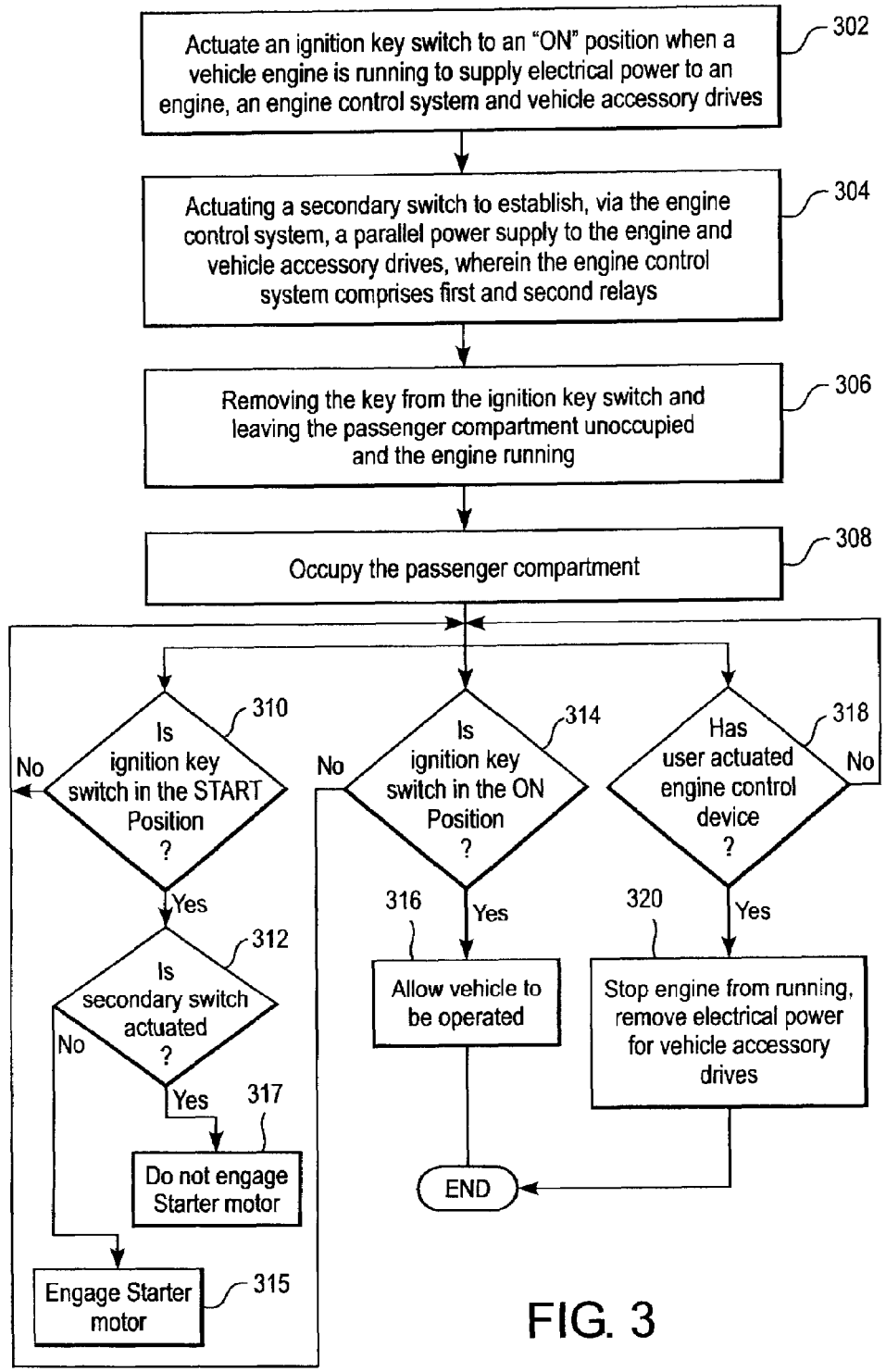
FIG. 3 is a flow chart of an exemplary method for using an embodiment of the present invention.

With reference to FIG. 3, a method of controlling the operation of a vehicle will be described in more detail. Vehicles typically comprise a passenger compartment, a vehicle accessory drive, an engine, user-activated vehicle control devices, a starter motor and an electrical power supply. The exemplary method utilizes an engine control system comprising at least a first and second relay for controlling the establishment of a parallel electrical power supply path to the vehicle. The parallel electrical power supply path provides power to the vehicle, including the engine, engine control system, engine fuel injection system, engine control computer, distributor system and any other systems that require electrical power.

The user-activated vehicle control devices can include an accelerator pedal, brake pedal, gearshift, clutch pedal, emergency brake setting and releasing levers and/or pedals, and other such devices.

After starting the operation of the engine by turning the ignition key switch to the START position, the ignition key switch is turned to the ON position. The first step of the method is when a user actuates an ignition key switch to an ON position, when a vehicle engine is running, to supply electrical power to an engine, an engine control system, and vehicle accessory drives (302). In step 304, a user-activated secondary switch is activated (placed in an ON or CLOSED position) to establish via the engine control system the parallel electrical power supply path to the engine and vehicle accessory drives of the vehicle. In order to keep the vehicle engine running while performing work outside the vehicle, the user removes the key from the ignition key switch, and leaves the passenger compartment unoccupied while the engine is running (306). The user, after performing the work, enters the passenger compartment (308). Once the user enters the passenger compartment, the user may perform certain operations resulting in different outcomes.

Firstly, the user may insert the key into the ignition key switch and actuate the ignition key switch. The engine control system determines if the key-switch has been moved to the START position (310), which is a typical action of a user entering a vehicle. If the ignition key switch is turned to the START position while the secondary switch is activated (312), the starter motor will not engage (315). However, if the secondary switch is not actuated, the starter motor is engaged (317).

Secondly, if the ignition key switch is not turned to the START position the ignition key switch may be turned to the ON position (314), in which case, the user will be allowed to operate the vehicle (316). Thirdly, if the key switch is not turned to the START position or the ON position, and the user actuates an engine control device, such as a brake pedal, emergency brake release, or clutch pedal, (318) the engine will stop running and electrical power will be removed from the vehicle accessory drives (320). If none of the conditions shown in steps 310, 314 or 318 occur, the decision making process goes back to the beginning and each of the individual conditions is checked for an occurrence prior to the state of the engine control system changing. The above order of the user actions, steps 310, 312, 314 or 318 can occur in any order, the above order is for illustrative purposes.

Although various exemplary embodiments have been described, it will be understood by those of ordinary skill in this art that these embodiments are merely illustrative and that many other embodiments are possible. The intended scope of the invention is defined by the following claims rather than the preceding description, and all variations that fall within the scope of the claims and equivalents thereof are intended to be in embraced therein.

What is claimed is:

1. A system for controlling operation of an engine and an accessory drive of a vehicle, the system comprising:
   an ignition switch for controlling the operation of the engine that enables the engine to operate when the ignition switch is in an ON state;
   a user-activated secondary switch for making a connection in a parallel electrical power supply circuit to the engine and vehicle accessory drive when the secondary switch is in the CLOSED state,
   a control logic circuit responsive to the ignition switch, the secondary switch, and a user-activated vehicle control device; and
   a third switch associated with a user-activated vehicle control device wherein the third switch causes the control logic circuit to interrupt the parallel electrical power supply circuit when the third switch is closed, and
   wherein the secondary switch remains in the CLOSED state during and after actuation of the user-activated vehicle control device.

2. The system of claim 1, wherein the ignition switch has two power wires providing power to the engine and the vehicle accessory drive.

3. The system of claim 1, wherein the control logic circuit comprises a first and second logic circuit that make connections in the parallel electrical power supply circuit to the engine and vehicle accessory drive when the secondary switch is left in the CLOSED state.

4. The system of claim 3, wherein when the secondary switch is in the CLOSED state and the ignition switch is in the OFF state, the engine is operating, the vehicle is immobile and the vehicle accessory devices are operational.

5. The system of claim 4, wherein if the user-activated vehicle control device is activated, a third logic circuit responds by causing the second logic circuit to remove power to the engine and the vehicle accessory drives.

6. The system of claim 5, wherein the user-activated vehicle control device is at least one of a brake pedal, an acceleration pedal, a clutch pedal, a gear shift device, or a parking brake release device.

7. The system of claim 1, wherein the ignition switch is a key switch and the key is removable.

8. The system of claim 1, wherein the secondary switch is left in the CLOSED state.

9. The system of claim 1, wherein the control logic circuit comprises: a first relay and a second relay responsive to the ignition switch, wherein the first relay and the second relay have plural contact terminals, wherein a contact terminal of the second relay makes a connection in the parallel electrical power supply path.

10. The system of claim 9, wherein contact terminals on the first relay are closed and electrical power is supplied to contact terminals of the second relay, when the ignition switch is in the ON state.

11. The system of claim 1, wherein when the secondary switch is in the CLOSED state and the ignition switch is in the ON state, the engine is operating, the vehicle is mobile and the vehicle accessory devices are operational.

12. The system of claim 1, wherein the control logic circuit completes the parallel electrical power circuit to the engine and vehicle accessory drives when the ignition switch is in the ON state and the secondary switch is left in the CLOSED position, thereby allowing the ignition switch to be turned to the OFF state and the engine will remain operating and electrical power will be supplied to the engine and the vehicle accessory drive.

13. A method for controlling operation of a vehicle, wherein the vehicle comprises a passenger compartment, a vehicle accessory device, an engine, a logic circuit a user-activated vehicle control device, a starter motor and an electrical power supply, comprising:
   switching an ignition key switch to an ON position when the vehicle engine is running, wherein electrical power is supplied to the engine and the vehicle accessory drive;
   activating a secondary switch to a CLOSED state to establish via the logic circuit a parallel electrical power supply path to the engine and vehicle accessory drive, wherein the logic circuit comprises a first device and a second device, wherein the first device provides an electrical signal to the second device causing the second device to close contact terminals for providing a parallel electrical power supply path to the engine and vehicle accessory drive, the secondary switch remaining closed during and after the user-activated vehicle control device is actuated;
   removing a key from the ignition key switch by switching the ignition key switch to an OFF position; and
   leaving the passenger compartment unoccupied with the engine running and electrical power supplied to the engine and vehicle accessory drive.

14. The method of claim 13, comprising:
   occupying the passenger compartment;
   activating the user-activated vehicle control device, whereby the signal from the first device to the second device is interrupted; and
   stopping the running of the engine, deactivating the vehicle accessory drive of the vehicle.

15. The method of claim 13, comprising:
   occupying the passenger compartment; inserting the key into the ignition key switch;
   actuating the ignition key switch in an attempt to start the running engine; and
   preventing the starter motor from engaging using a third device to prevent electrical power from being provided to the starter motor.

16. The method of claim 13, comprising:
   occupying the passenger compartment;
   inserting the key into the ignition key switch;
   actuating the ignition key switch to the ON position, wherein the vehicle is in a mobile state;
   moving the vehicle to another location, placing the vehicle in a parked position; and
   leaving the vehicle without activating the secondary switch.

17. The method of claim 13, wherein the first and second devices are relays or power integrated circuits.

18. A system for controlling the operation of an engine and an accessory drive of a vehicle, the system comprising:
   an ignition switch for controlling operation of the engine that enables the engine to operate when the ignition switch is in an ON state;
   a user-activated vehicle control device;
   a user-activated secondary switch for making a connection in a parallel electrical power supply circuit to the engine and vehicle accessory drive, said user-activated secondary switch remaining closed during and after the user-activated vehicle control device is actuated;
   a logic circuit responsive to the ignition switch, the secondary switch, and the user-activated vehicle control device; and a third switch associated with the user-activated vehicle control device wherein the third switch causes the logic circuit to interrupt the parallel electrical power supply path, the logic circuit comprising a first relay and a second relay, wherein the first relay causes the the contacts of the second relay to open, thereby interrupting the parallel electrical power supply path when the user-activated vehicle control device is activated.

19. The system of claim 18, wherein the third switch supplies an electrical signal to the first relay causing the contacts of the second relay to open.

20. The system of claim 18, wherein the secondary switch is left in the CLOSED position while the accessory drive of the vehicle is operated.

* * * * *